United States Patent [19]

Kim

[11] Patent Number: 5,495,377
[45] Date of Patent: Feb. 27, 1996

[54] APPARATUS FOR ATTACHING A PRINTED CIRCUIT CABLE TO AN ACTUATOR ARM IN A DISC DRIVE ASSEMBLY UTILIZING ALIGNMENT PINS

[75] Inventor: Charles S. Kim, Santa Clara County, Calif.

[73] Assignee: Seagate Technology, Inc., Scotts Valley, Calif.

[21] Appl. No.: 70,608

[22] Filed: May 27, 1993

[51] Int. Cl.$^6$ .............................. G11B 21/02; H05K 1/00
[52] U.S. Cl. ........................ 360/106; 360/108; 439/67; 361/749
[58] Field of Search ..................... 360/104, 105, 360/106, 97.01, 97.02, 97.03; 361/749, 789, 825; 174/254, 268; 439/67, 77, 83

[56] References Cited

U.S. PATENT DOCUMENTS

| | | | |
|---|---|---|---|
| 3,567,844 | 3/1971 | Kremar | 174/268 |
| 3,633,189 | 1/1972 | Billawala | 340/174.1 F |
| 4,476,404 | 10/1984 | Bygdnes | 310/27 |
| 4,544,973 | 10/1985 | Van De Bult | 360/106 |
| 4,724,499 | 2/1988 | Bratvold et al. | 360/98 |
| 4,879,617 | 11/1989 | Sampietro et al. | 360/106 |
| 4,913,656 | 4/1990 | Gordon et al. | 439/77 |
| 4,985,793 | 1/1991 | Anderson | 360/105 |
| 5,055,969 | 10/1991 | Putnam | 360/104 |
| 5,083,424 | 1/1992 | Becker | 60/39.31 |
| 5,095,396 | 3/1992 | Putnam et al. | 360/106 |
| 5,103,359 | 4/1992 | Marazzo | 360/104 |
| 5,121,273 | 6/1992 | Slezak | 360/108 |
| 5,212,679 | 5/1993 | Tohkainin | 360/97.03 |
| 5,224,023 | 6/1993 | Smith et al. | 174/254 |
| 5,278,709 | 1/1994 | Thornton et al. | 360/97.01 |
| 5,303,101 | 4/1994 | Hatch et al. | 360/105 |
| 5,325,252 | 6/1994 | Yagi et al. | 360/106 |
| 5,331,486 | 7/1994 | Hachiya et al. | 360/97.03 |
| 5,375,021 | 12/1994 | Boeckner | 360/105 |

FOREIGN PATENT DOCUMENTS

| | | | |
|---|---|---|---|
| 4-72689 | 3/1992 | Japan | 361/749 |
| 4-72789 | 3/1992 | Japan | 361/749 |
| 4-307987 | 10/1992 | Japan | 174/254 |
| 5-6632 | 1/1993 | Japan | 360/104 |
| 6-61591 | 3/1994 | Japan | 361/749 |

OTHER PUBLICATIONS

IBM Technical Disclosure Bulletin, "Actuator Assembly for a Disk File", Dunman et al., vol. 20, No. 5, Oct. 1977, p. 1984.
French Reference No. 1, 296,624, May 1962.

*Primary Examiner*—John H. Wolff
*Assistant Examiner*—David L. Ometz
*Attorney, Agent, or Firm*—Flehr, Hohbach, Test, Albritton & Herbert

[57] ABSTRACT

An apparatus for attaching a printed circuit cable (PCC) to the actuator arm assembly of a disc drive including, an actuator arm having a pivot with a plurality of alignment pins and attachment means to mechanically, electrically and non-rotatably connect a PCC to an actuator arm pivot. The attachment means include passing the alignment pins through complementarily located alignment apertures in the PCC and soldering the pins to the adjacent pads located on the PCC. The attachment means further provide routing means for separating and directing the printed circuit trace wires to the motor coil extension pin interface and the read/write signal pad interface on the actuator arm assembly.

5 Claims, 7 Drawing Sheets

APPARATUS FOR ATTACHING A PRINTED CIRCUIT CABLE TO AN ACTUATOR ARM IN A DISC DRIVE ASSEMBLY UTILIZING ALIGNMENT PINS

The present invention relates generally to disc drive systems and particularly to an apparatus for attaching a printed circuit cable (PCC) to the read/write head actuator arm assembly whereby a plurality of alignment pins support the PCC preventing the cable from detaching or rotating while minimizing the cable height and amount of resultant bias applied to the arm due to the cable.

BACKGROUND OF THE INVENTION

The present invention provides an improvement to the read/write head actuator assembly in small disc drive systems.

In a disc drive, the read/write heads are attached to an actuator arm. A voice coil magnetic motor provides the force to move the arm about a pivot and position the heads over a desired portion of the disc. This arrangement is known as a head disc assembly.

The information supplied to the heads (write) or supplied by the heads (read) is normally carried by small wires from the heads to a point near the actuator arm pivot. A flexible printed circuit cable (PCC) is secured to the arm and the small signal carrying wires are soldered to the PCC. Additionally, the PCC carries signals to activate the moving coil motor and effectuate actuator arm rotation. In many disc drives, the PCC carries the read head signals from the moving arm to a fixed circuit board having a preamplifier to amplify the signals before sending them to a signal processing circuit elsewhere in the disc drive.

In many previous disc drive designs, the flexible PCC was bent to form an arc between the circuit board and the arm. The end was then attached to the arm, secured via an adhesive. The use of adhesive within the disc housing is usually to be avoided, except in arrangements where no other choice is apparent, because adhesives may outgas and produce particles which will contaminate the discs and or the heads. Additionally, the use of adhesives in manufacturing makes repeatable assembly very difficult and requires a cleaning step to minimize the amount of adhesive that is introduced into the disc drive environment. However disc drive designers wishing to avoid adding mass to the actuator arm have deemed a small amount of adhesive as necessary at the expense of the outgassing problems and manufacturing repeatability.

Recognizing the side effects of using adhesives in disc drives, other means for attaching the PCC to the actuator arm have been developed utilizing a screw and clamp structure as demonstrated in Jabbari et al. Ser. No. 07/611,992, U.S. Pat. No. 5,267,366, incorporated herein by reference. However, these methods required a large hole in the PCC cable to pass the screw body in order to fixably attach the PCC to the actuator arm. The resultant hole and support structure required to reinforce the receiving portion of the PCC, increased the height and mass of the PCC and therefor are less desirable in thin disc drive usage.

Another area of concern in the screw and bracket designs of the prior art is the alignment of the PCC with respect to the printed circuit board and the actuator arm assembly. When utilizing the screw and bracket attachment means of the prior art, special care had to be exercised to prevent the PCC from rotating. As the screw was tightened, rotation would often result necessitating a larger keep-out area for the PCC in the disc drive envelope or separate alignment apparatus or process steps.

In the prior art, motor sizing had to be accomplished accounting for the bias due to the arc in the PCC. Bias is the resultant force upon the actuator arm due to the arc in the PCC, thereby causing pivoting of the arm to an arbitrary position. The bias must be overcome by the actuator motor to reposition the arm. Thus, a large bias requires a powerful motor to overcome the bias. In small disc drives it is desired to design the actuator motor as small as possible. This requires using low mass parts, reducing bearing friction, and minimizing the bias.

Those ordinarily skilled in the art will recognize the larger the mass of the PCC, the larger the resultant bias. As was recited above the prior art screw and clamp mechanisms required a large hole and support structure on the PCC for use with the attachment screw, thus proportionately increasing both the mass of the PCC and the bias.

In addition to minimizing the bias, the bias must be consistent during repeated operation of the actuator arm. A consistent bias means the actuator motor can be designed and operated to overcome a specific, known bias over the full operating range of the actuator arm.

Past attempts at minimizing the bias have resulted in complex cabling strategies. One such connection disclosed in U.S. Pat. No. 4,933,785 maintains two opposing bend radii in the PCC to obtain counteracting bias forces resulting in bias minimization, a solution which is difficult to repeatably assemble.

SUMMARY OF THE INVENTION

In summary, the present invention is an apparatus for securing a printed circuit cable (PCC) to the actuator arm in a disc drive. The preferred embodiment is designed to connect a printed circuit cable (PCC) to the actuator arm such that the PCC remains fixedly attached, unable to rotate, while minimizing the bias upon the arm due to the cable.

To overcome the limitations of the prior art, it is an object of the present invention to fixably attach a PCC to an actuator arm assembly without the use of adhesives. In particular the invention secures the PCC using alignment pins and solder.

It is also an object of the present invention to fixably attach the PCC without the use of adhesives while minimizing the overall height and mass of the PCC for attachment to an actuator arm assembly, thereby minimizing the bias to be overcome by the actuator motor.

It is a further object of the present invention to provide a self aligning apparatus for attaching a PCC to an actuator arm assembly where alignment is maintained between the arm assembly and the PCC by simple means.

It is another objective of the current invention is to provide an attachment apparatus which maintains a small bias that is consistent during repeated arm rotations. In particular, the apparatus maintains a specific bend radius and reduced mass in the PCC to effectuate the bias consistency, but uses a simple arrangement.

The apparatus is designed to effectuate bias minimization and bias consistency while maintaining the alignment of the PCC with respect to the actuator arm assembly and the printed circuit board. Further, the cable is secured without using adhesives, by means designed to minimize the height and mass of the PCC.

The apparatus includes an actuator arm having a pivot with a plurality of alignment pins and attachment means to mechanically, electrically and non-rotatably connect a PCC to an actuator arm pivot. The attachment means include passing the alignment pins through complementarily located alignment apertures in the PCC and soldering the pins to the adjacent pads located on the PCC. The attachment means further provide routing means for separating and directing the printed circuit trace wires to the motor coil extension pin interface and the read/write signal pad interface on the actuator arm assembly.

BRIEF DESCRIPTION OF THE DRAWINGS

Additional objects and features of the invention will be more readily apparent from the following detailed description and appended claims when taken in conjunction with the drawings, in which:

FIG. 4b is an expanded view of a section of FIG. 4a;

FIG. 5b is an expanded view of a section of FIG. 5a;

FIG. 6a is an planar view of the printed circuit cable of the preferred embodiment of the present invention;

FIG. 6b is an expanded view of a section of FIG. 6a; and

DESCRIPTION OF THE PREFERRED EMBODIMENT

Figure 1:
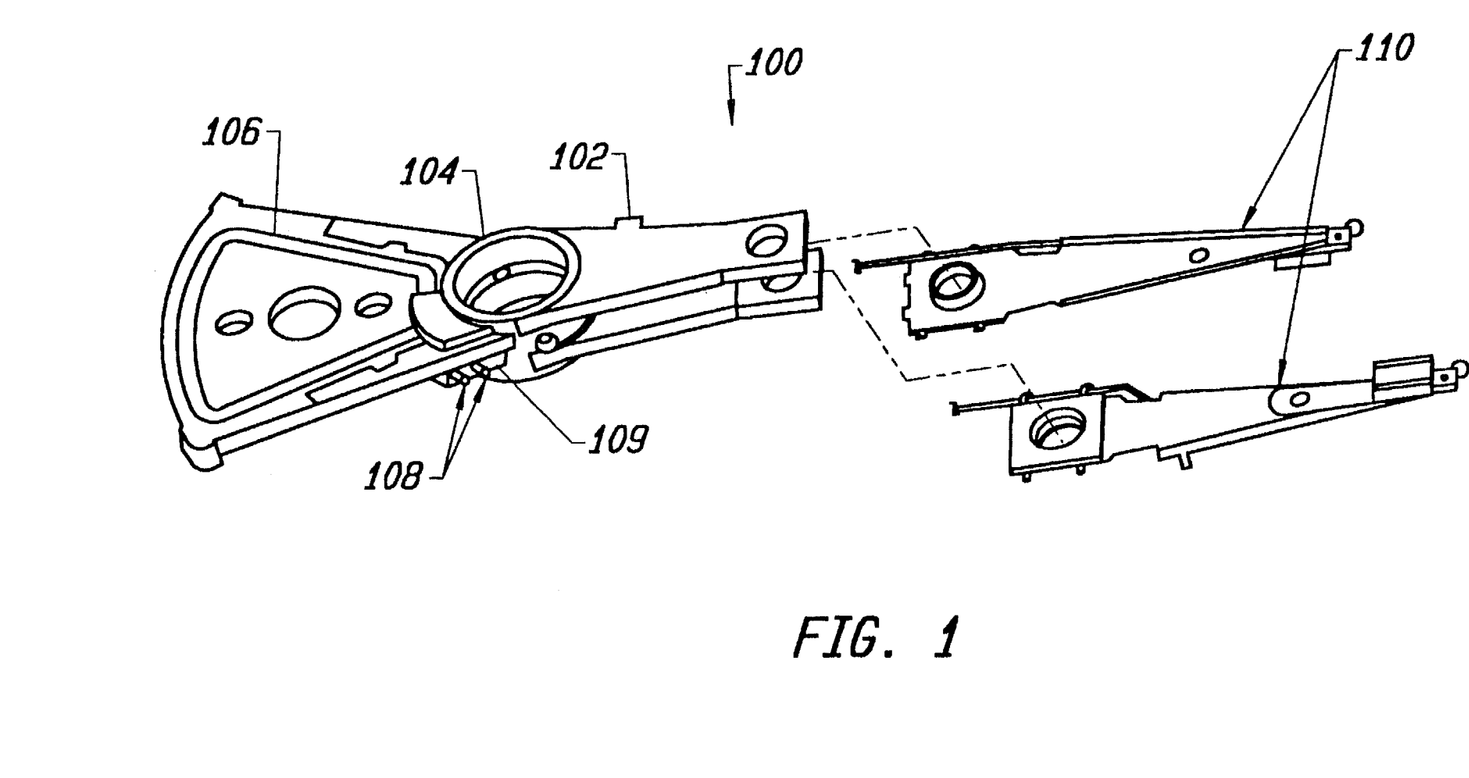
FIG. 1 is an isometric view of an actuator arm in a disc drive incorporating the preferred embodiment of the invention.

Referring to FIG. 1, there is shown an isometric view of an actuator arm assembly 100 for a disc drive incorporating the preferred embodiment. The actuator arm assembly 100 includes a substantially triangular shaped actuator arm 102 having a pivot 104 around which the arm 102 rotates. A coil assembly 106 is attached to one end of arm 102 to provide the force required to pivot the arm 102. The coil assembly 106 includes a pair of extension pins 108 mounted on a molded terminal guard 109 for receiving the electrical control signals required to move the actuator arm assembly 100. Located at the other end of arm 102 is a read/write head assembly 110. In combination, the coil assembly 106 provides the force to rotate the actuator arm assembly 100 about pivot 104 to position the read/write head assembly 110 in a disc drive.

Figure 2:
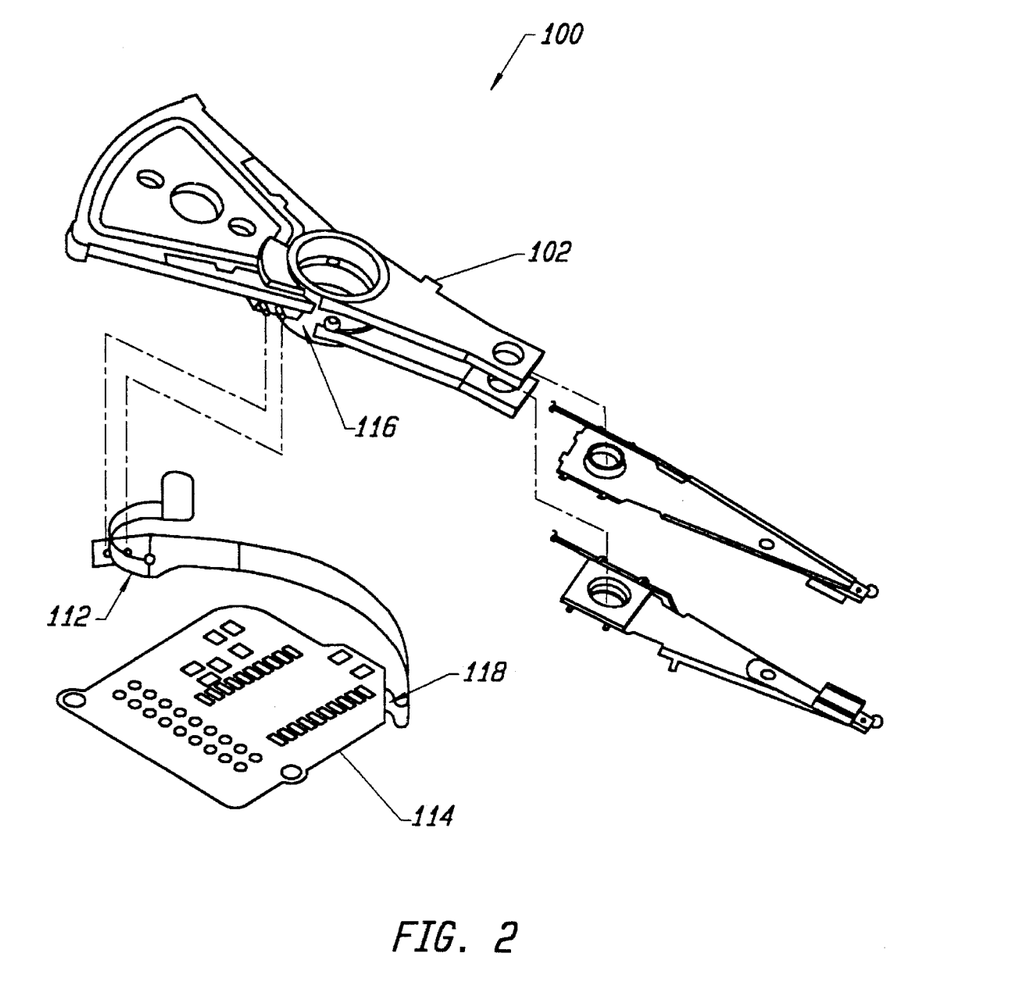
FIG. 2 is an isometric view of an actuator arm and printed circuit cable in a disc drive incorporating the preferred embodiment of the invention.

Referring now to FIG. 2, the information to and from the read/write heads 110 and the signals to effectuate movement of the coil assembly 106 is supplied to the moving portion of the arm assembly 100 via a printed circuit cable (PCC) 112. A fixed printed circuit board 114 supplies the signals for motor control and for the write heads through the PCC 112. FIG. 2 is an isometric view of the actuator arm assembly 100 in combination with PCC 112 and printed circuit board 114.

It is important that PCC 112 is secured at each end to provide a stable connection at both the actuator arm attachment point 116 and the printed circuit board attachment point 118. The preferred embodiment of the current invention focuses upon the necessity for a secure attachment to the actuator arm 102 at the attachment point 116.

Figure 3:
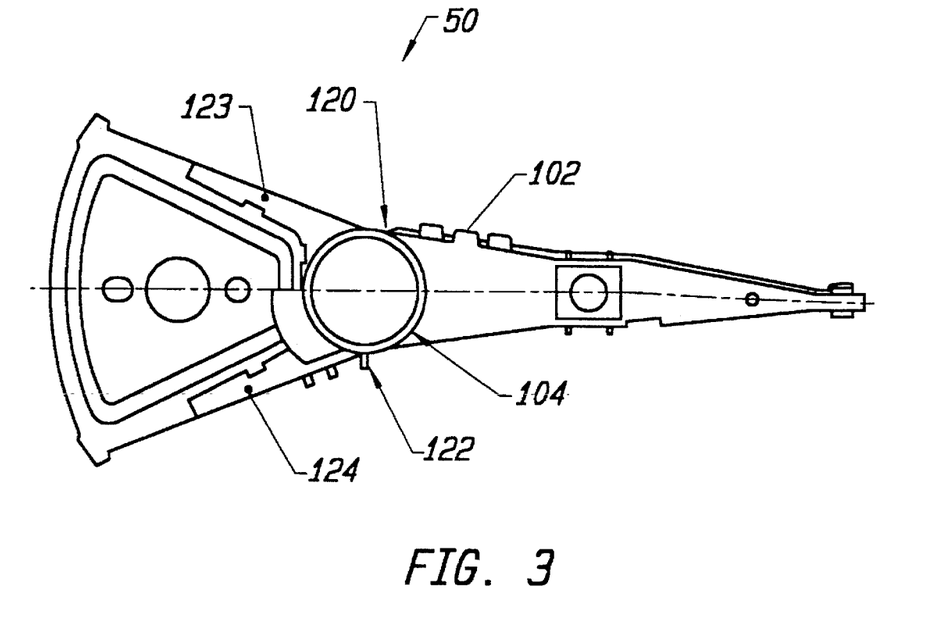
FIG. 3 is a top view of the actuator arm in FIG. 1.

Referring now to FIG. 3 through 7., the cable securing apparatus 50 of the preferred embodiment of the present invention is shown. FIG. 3. shows the actuator arm 102 provided with a pair of alignment pins 120 and 122 attached to the pivot 104 and on opposed sides thereof. The pivot 104 also includes complementary first 123 and second support flanges 124 attached at one end of the pivot 104 for supporting the coil assembly 106.

Figure 4A:
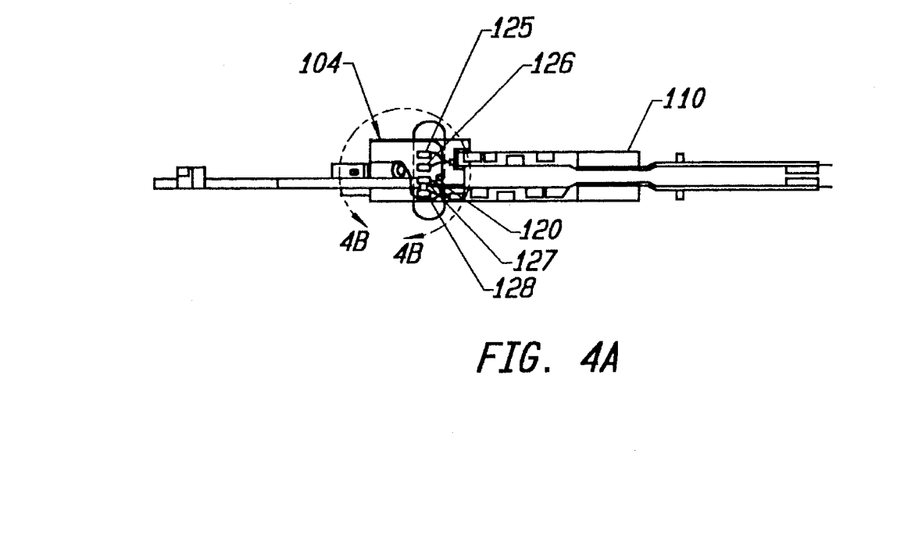
FIG. 4a is first side view of the actuator arm in FIG. 3, as viewed by rotating the actuator arm +90° about the x axis.

Referring first to FIG. 4a, a first side view of the preferred embodiment of the present invention is shown. The pivot 104 also includes four signal pads 125, 126, 127 and 128 aligned vertically and equidistant from each other and the bottom of the pivot 104, mounted between the second support flange 124 and the read/write assembly 110 attachment point on the pivot 104.

Figure 4B:
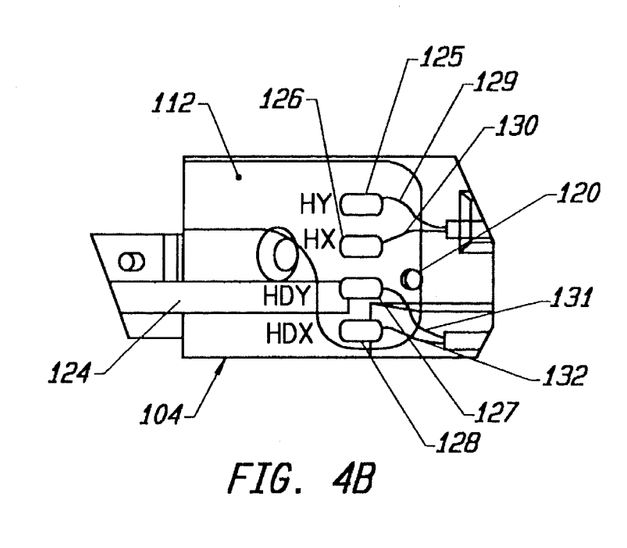

Referring now to the exploded view FIG. 4b of this first side, connected to the signal pads 125, 126, 127 and 128 are four control wires 129, 130, 131, and 132. The control wires 129 through 132 form part of the read/write head assembly 110 and pass signals from the signal pads 125 through 128 to the read/write transducers (not shown) on the read/write head assembly 110. The signal pads 125 through 128 provide an accessible electrical interface for the read/write heads 110 at the side of the pivot 104, whereby electrical control signals can be passed between the read/write head assembly 110 and the printed circuit board 114.

The configuration of alignment pin 120 with respect to the signal pads 125, 126, 127 and 128 in the preferred embodiment is shown. Alignment pin 120 is located along the pivot 104 between the read/write head assembly 110 and the signal pads 126 and 127. Those ordinarily skilled in the art will recognize the placement of the alignment pin 120 with respect to the signal pads may be varied, and this placement should not be construed as limiting. In the preferred embodiment, the alignment pin 120 was made from brass and pressed into the aluminum casting forming the pivot 104. Those of ordinary skill in the art will recognize the pin may be made from any similar electrical conductive material as is known in the art, brass being selected to facilitate a pressed pin attachment method. Similarly, the alignment pin 120 may be attached to the pivot by other means as is known in the art.

Figure 5A:
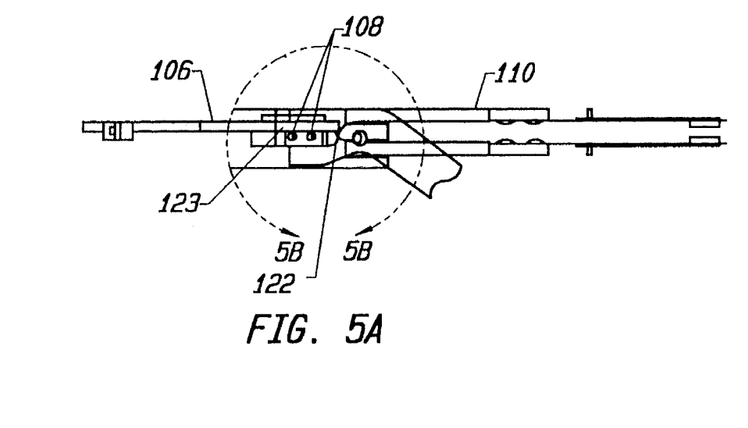
FIG. 5a is second side view of the actuator arm in FIG. 3, as viewed by rotating the actuator arm −90° about the x axis.
Figure 5B:
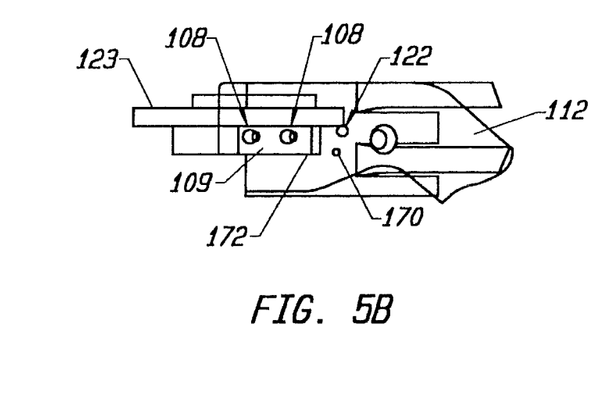

Referring to FIG. 5a, a second side view of the preferred embodiment of the present invention is shown including alignment pin 122 and with respect to extension pins 108. In the exploded view FIG. 5b of this second side, alignment pin 122 is centrally located along the pivot 104 between the read/write head assembly 110 and the extension pins 108, mounted just below the junction formed by the first support flange 123 and the pivot 104. Those ordinarily skilled in the art will recognize the placement of the alignment pin 122 with respect to the extension pins 108 may be varied, and this placement should not be construed as limiting. In the preferred embodiment the alignment pin 122 was made from brass and pressed into the aluminum casting forming the pivot 104. Those of ordinary skill in the art will recognize the pin may be made from any similar electrical conductive material as is known in the art, brass being selected to facilitate a pressed pin attachment method. Similarly, the alignment pin 122 may be attached to the pivot by other means as is known in the art.

Figures 6A, 6B:
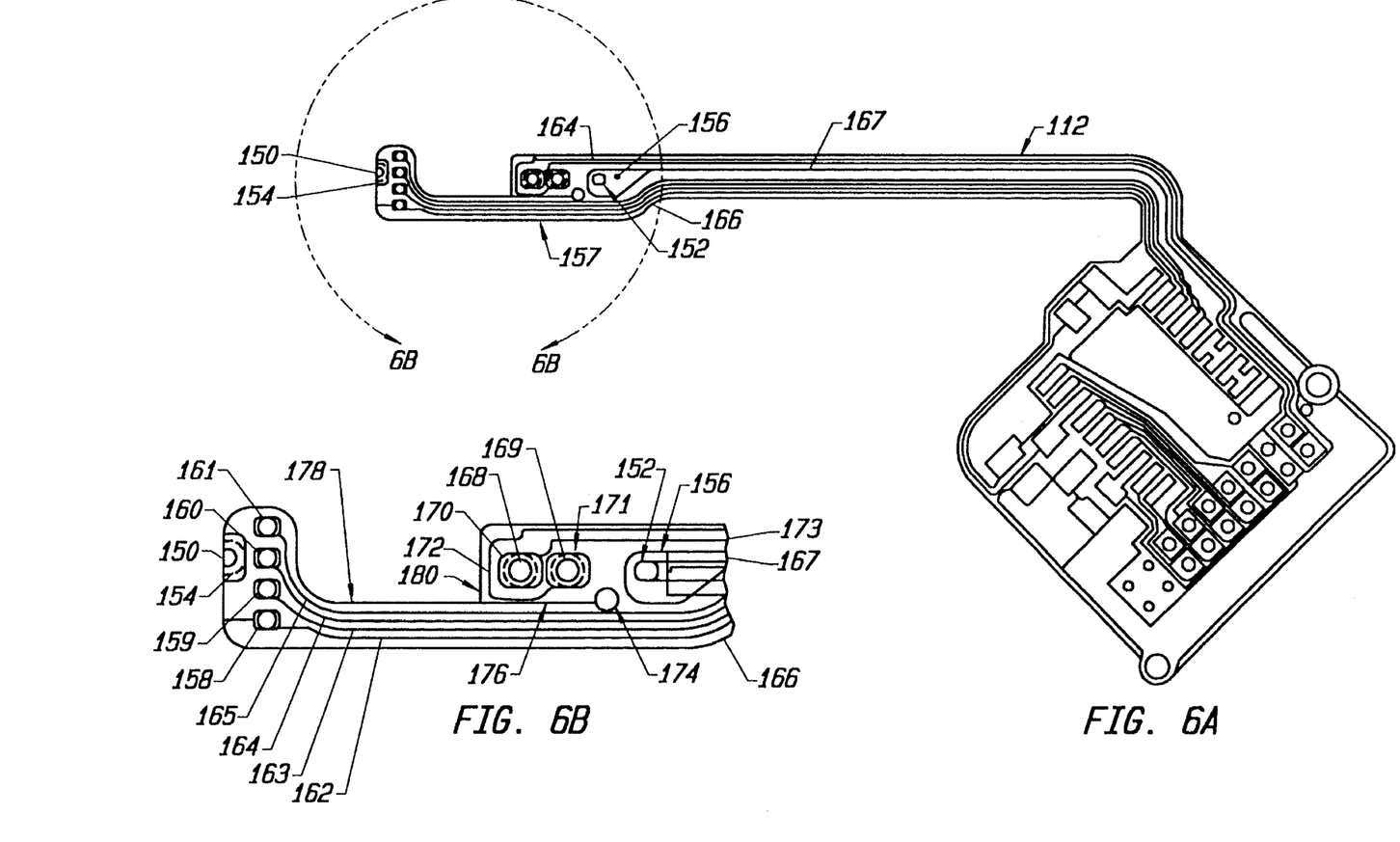

In FIG. 6a there is shown a perspective view of a PCC 112 of the preferred embodiment of the invention. The PCC 112 is provided with a pair of alignment apertures 150 and 152, each encircled by complementary pads 154 and 156 located along a first end 157 of the PCC 112 which is to be attached to the actuator arm 102.

In the exploded view FIG. 6b of the PCC 112, first alignment aperture 150 and complementary pad 154 are located on the edge of the first end 157 of the PCC 112. In the preferred embodiment, aperture 150 is of semicircular shape of arc length 270° and a diameter of 0.022 inches. Those ordinarily skilled in the art will recognize that the semicircular aperture 150 may be of any arc length greater than 180° thus suitably adapted to hold the end of the PCC 112 upon attachment to the actuator arm 102.

Pad 154 serves to reinforce the PCC 112 at the aperture 150 and provide a suitable attachment surface for soldering. Pads and apertures formed on printed circuit cables, and their manufacture, are well known in the art. The pad 154 is formed as is known in the art around, and extending from the apertures 150. In the preferred embodiment the pad extends outward from the edge of the aperture a distance of 0.050 inches.

Adjacent to the alignment aperture are four trace terminations 158, 159, 160 and 161 aligned vertically and equidistant from each other mounted on the first end 157 of the PCC 112. Electrically and mechanically attached to the trace terminations 158 through 161 are four trace wires 162, 163, 164, and 165. The trace wires 162 through 165 form part of the PCC 112 and pass signals from the trace terminations 158 through 161 to the printed circuit board 114. Upon installation of the PCC 112, the termination pads 158 through 161 are soldered to the signal pads 125 through 128, thereby providing an accessible electrical interconnection means, whereby electrical control signals can be passed between the read/write head assembly 110 and the printed circuit board 114.

Trace terminations and traces formed on printed circuit cables, and their manufacture, are well known in the art. The terminations 158 through 161 and traces 162 through 165 are formed as is known in the art. In the preferred embodiment the terminations are circular in shape and a diameter of 0.028 inches.

In the exploded view FIG. 6b of the PCC 112, the second alignment aperture 152 and complementary pad 156 are located centrally disposed in the PCC 112 at the base of the neck 166 of the PCC 112. In the preferred embodiment, aperture 152 is of rounded rectangular shape with a major axis length of 0.038 inches and a minor axis length of 0.022 inches. Those ordinarily skilled in the art will recognize that the rounded rectangular aperture 152 allows for dimensional tolerance build-up that may arise due to differences between any individual actuator arm 102 and PCC 112 combination.

Pad 156 serves to reinforce the PCC 112 at the aperture 152 and provide a suitable attachment surface for soldering, while also providing an electrical interface between the PCC 112 and the actuator arm 102 by means of a grounding trace 167. Pad 156 thereby provides a ground reference signal to the printed circuit board 114 via the PCC 112. Pads and traces formed on printed circuit cables, and their manufacture, are well known in the art. The pad 156 and grounding trace 167 are formed as is known in the art. In the preferred embodiment the pad extends outward from the edge of the aperture a distance of 0.050 inches.

Two additional apertures, extension pin apertures 168 and 169, are located between the alignment apertures 150 and 152 disposed on the first end 157 of the PCC 112. The extension pin apertures 168 and 169 are disposed centrally within complementary pads 170 and 171, and include a pair of motor control signal traces 172 and 173. The motor control signal traces 172 and 173 provide an electrical interface for receiving the electrical control signals required to move the actuator arm assembly 100.

In the preferred embodiment these apertures 168 and 169 are of circular shape of diameter 0.028 inches. In the preferred embodiment, the pads 170 and 171 are rectangular in shape with rounded corners of length 0.062 inches and width 0.045 inches. Apertures, pads and traces formed on printed circuit cables, and their manufacture, are well known in the art. The apertures 168 and 169, pads 170 and 171, and motor control signal traces 172 and 173 are produced as is known in the art.

A cutout 174 and cutline 176 are provided in the PCC 112, whereby the first end 157 of the PCC 112 is separated into a first 178 and second leg 180. The cutout 174 is fixably located between, and set out below, the alignment aperture 152 and the extension pin aperture 169. Those ordinarily skilled in the art will recognize the circular cutout 174 is designed to prevent the cutline 176 from extending any farther along the PCC 112 in the direction of the neck 166, allowing the legs 178 and 180 to be able to be separated without tearing of the PCC 112.

In the preferred embodiment of the present invention, the cutout 174 is circular in shape and of a diameter of 0.030 inches. The cutline 176 extends from the cutout 174 past the extended pin apertures 168 and 169, thereby forming the first 178 and second legs 180 of the PCC 112. The legs are pivotally separatable at their junction, the cutout 174, along the line of the cut line 176.

Printed circuit cables and the method for their manufacture are well known in the art. The PCC 112 of the preferred embodiment is formed as is known in the art, and only the apertures, cutouts, and the grounding scheme described above are novel.

Figure 7:
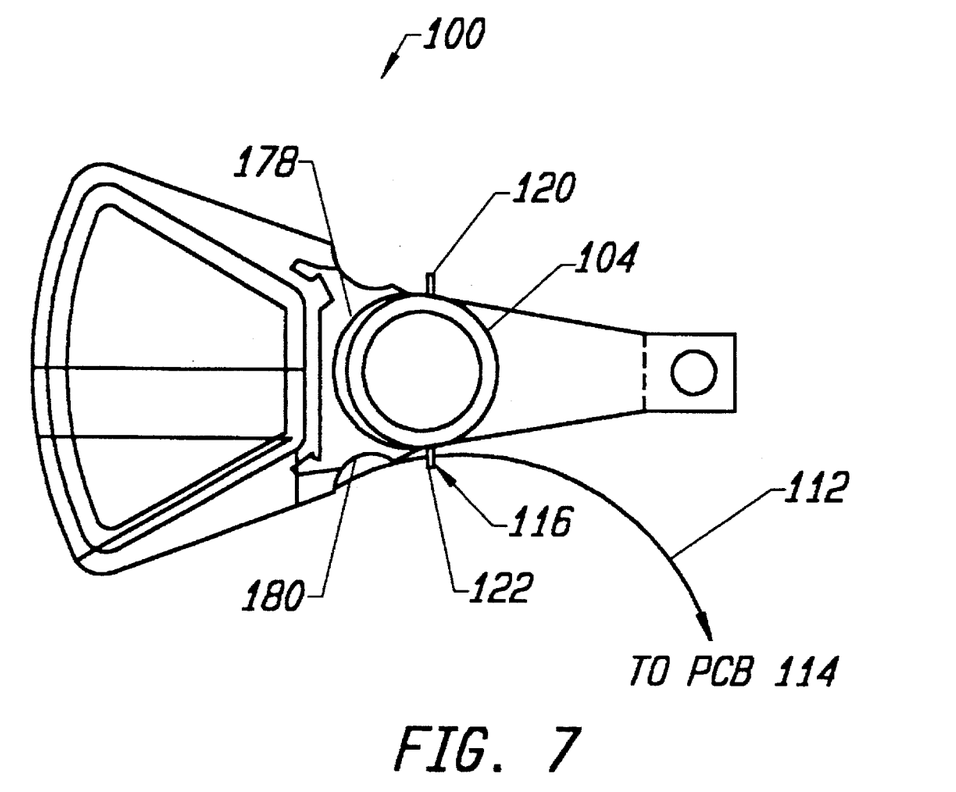
FIG. 7 is a perspective view of the final assembled PCC and actuator arm of the preferred embodiment of the invention.

Referring now to FIG. 7, a perspective view of the present invention is shown, whereby the PCC 112 has been fixably attached to the pivot 104 of the actuator arm assembly 100. Specifically, the PCC 112 is fixably attached to the pivot 104 by first locating the alignment aperture 150 over the alignment pin 120, and thereafter soldering the pin 120 to the pad 154. The first end 157 of the PCC 112 is then wrapped around the pivot 104 circumferentially so as to locate the second alignment aperture 152 over alignment pin 122, temporarily holding the first leg 178 of the PCC 112 to the pivot 104.

The second leg 180 is thereafter separated away from the fist leg 178, by means of the cutline 174, allowing the extension pins 108 to align with the extension pin apertures 168 and 169 for soldering to the pads 170 and 171. After soldering the extension pins 108 in place, alignment pin 122 is permanently attached to the pad 156 by solder, thereby completing the electrical and mechanical attachment of the PCC 112 to the actuator arm assembly 100. This arrangement allows the PCC 112 to be secured to the pivot 104 without using adhesives, by means designed to minimize the height and mass of the PCC 112.

In achieving minimum bias upon the actuator arm 102, PCC 112 is secured about the pivot 104 by means of alignment pins 120 and 122. The inventive cable securing apparatus 50 forces the flexible PCC 112 at its initial attachment point 116 into an arc toward the printed circuit board 114, while directing the end of the PCC on a circumferential path adjacent to the pivot 104 until it attaches on the opposing side of the pivot 104. This arrangement provides bias minimization and bias consistency while maintaining the alignment of the PCC with respect to the actuator arm assembly and the printed circuit board.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. In a disc drive, an apparatus for electrically connecting a printed circuit board to an actuator arm having read/write heads and a motor coil comprising:

first and second alignment pins disposed on and extending radially from a central pivot of said actuator arm, said first alignment pin adjacent to at least one pivot bonding pad disposed on said pivot and said second alignment pin opposing said first alignment pin and facing said printed circuit board; and a printed circuit cable including a conductive portion embedded in a nonconductive support portion, said conductive portion having at least one trace wire terminated in at least one cable bonding pad, said printed circuit cable further including attachment means for connecting said printed circuit cable to said first alignment pin, such that said printed circuit cable is mechanically, electrically and non-rotatably attached to said actuator arm at said pivot without utilizing adhesives, said cable further including a grounding means for providing an electrical ground reference signal from said pivot to said printed circuit board of said disc drive, said grounding means comprises; an aperture having a concentric soldering pad located on said printed circuit cable;

a ground trace in said printed circuit cable, said ground trace contacting and electrically connected to said soldering pad;

a first grounding pin serving as said second alignment pin, said first grounding pin integral to and extending radially from said pivot, whereby upon mounting of said printed circuit cable on said pivot, said first grounding pin passes through and protrudes beyond said aperture; and connecting means for electrically connecting said protruding first grounding pin to said printed circuit cable at said pad.

2. The apparatus of claim 1 wherein said attachment means comprises a second aperture in said nonconductive support portion of said printed circuit cable complementarily located to join with said first alignment pin, and a second soldering pad concentric to said aperture, whereby said second printed circuit cable is fixably attached to said actuator arm by soldering.

3. The apparatus of claim 2 wherein said attachment means further include a cut out and cut line on one end of said printed circuit cable;

said cutout substantially circular in shape;

said cut line extending from said cutout along the length of said printed circuit cable ending at a first attachment point corresponding to said second alignment pin on said pivot, thereby forming a first and second leg on said one end of said printed circuit cable;

said first leg having a first plurality of said trace wires for transferring data and control signals to and from said read/write heads, said first leg encircling an upper portion of said pivot and connected to said pivot at said first alignment pin by soldering;

said second leg having a second plurality of said trace wires for transferring control signals to and from said motor coil, said second leg connected to said pivot at said second alignment pin by soldering;

such that said attachment means separates and directs said printed circuit trace wires to said motor coil and said read/write heads on the actuator arm assembly.

4. The apparatus of claim 1 wherein said attachment means comprises soldering.

5. The apparatus of claim 1 wherein said printed circuit cable is attached to said printed circuit board, such that upon mounting said printed circuit cable onto said pivot by said attachment means, said printed circuit cable gradually arcs away from said pivot forming a loose loop ending at said connection to said printed circuit board.

* * * * *